United States Patent [19]
Silverbrook et al.

[11] Patent Number: 5,751,272
[45] Date of Patent: May 12, 1998

[54] DISPLAY PIXEL BALANCING FOR A MULTI COLOR DISCRETE LEVEL DISPLAY

[75] Inventors: Kia Silverbrook, Leichhardt, Australia; William Clark Naylor, Jr., Santa Clara, Calif.

[73] Assignee: Canon Kabushiki Kaisha, Tokyo, Japan

[21] Appl. No.: 402,507

[22] Filed: Mar. 13, 1995

[30] Foreign Application Priority Data

Mar. 11, 1994 [AU] Australia ................... PM4402
Mar. 11, 1994 [AU] Australia ................... PM4408

[51] Int. Cl.⁶ ................................................. G09G 3/36
[52] U.S. Cl. ................... 345/149; 345/152; 345/150; 349/144
[58] Field of Search ........................ 345/149, 147, 345/152, 43, 103, 89; 349/144, 146, 85; G09G 3/36

[56] References Cited

U.S. PATENT DOCUMENTS

| | | |
|---|---|---|
| 4,811,003 | 3/1989 | Struthman et al. ................ 345/152 |
| 4,965,565 | 10/1990 | Noguchi ............................ 345/93 |
| 5,124,695 | 6/1992 | Green ................................ 345/149 |
| 5,157,524 | 10/1992 | Dijon et al. ....................... 359/54 |
| 5,552,800 | 9/1996 | Uchikoga et al. .................. 345/149 |

FOREIGN PATENT DOCUMENTS

| | | |
|---|---|---|
| 0322106 | 6/1989 | European Pat. Off. . |
| 0526135 | 2/1993 | European Pat. Off. . |
| 2637407 | 4/1990 | France . |
| 59-128058 | 3/1986 | Japan . |

*Primary Examiner*—Michael H. Lee
*Attorney, Agent, or Firm*—Fitzpatrick, Cella, Harper & Scinto

[57] ABSTRACT

A pixel display includes a pixel pattern containing multiple pixels each of which having multiple primary color sub-regions of illumination. These sub-regions are arranged such that they extend in a first direction substantially from one side of the pixel to the other, and in a second direction, substantially normal to the first direction, they have only a limited extent in the pixel. These sub-regions include a multiple number of illumination areas and are arranged such that the center of illumination is substantially stable with respect to movement in the first direction and is substantially constrained to movement in the second direction.

23 Claims, 20 Drawing Sheets

The sixteen levels
of red within a pixel

The sixteen levels
of green within a pixel

The sixteen levels
of blue within a pixel 5,751,272

DISPLAY PIXEL BALANCING FOR A MULTI COLOR DISCRETE LEVEL DISPLAY

FIELD OF THE INVENTION

The present invention relates to the display of Colour Images, and, in particular, to the display of colour images on a discrete level display device such as a plasma panel display or a liquid crystal display device.

BACKGROUND OF THE INVENTION

U.S. Pat. No. 5,124,695 (Green/Thorn EMI) discloses a monochrome discrete level display adapted to display a gray scale, in which each pixel is formed of four separately energizable areas which have relative light intensity outputs in the ratio of 1:2:4:8 respectively. FIG. 5 of U.S. Pat. No. 5,124,695 is reproduced as FIG. 1 herein. Each of the areas of illumination having Roman numerals I–IV has a number of portions, which are spaced-apart and concentrically arranged, in order to have the same average position when illuminated, so that different bit patterns cause the pixel to change in brightness only, without any apparent change in position.

As best seen from FIG. 5 of this U.S. patent (FIG. 1 herein), the need to maintain concentrically arranged areas of illuminosity results in a substantial portion 1 of the area of each pixel 2 being occupied by opaque portions of the screen with the resulting aperture being defined by the Roman numerals I to IV. It can be clearly seen that the aperture is severely restricted. Normally, this aperture is utilised by shining an intense white back light through the display with the areas illuminated being defined by the various apertures of each pixel in conjunction with the set state for that display.

In order to obtain a colour display, colour filters are normally placed over the apertures with one colour filter for each desired primary colour of the display. One common form of colour display is a red, green, blue (RGB) display which has separate red, green and blue pixel sub-portions for each pixel of the display.

U.S. Pat. No. 5,124,695 further discusses the creation of a colour display through the juxtapositioning of Red, Green and Blue pixels, each created in accordance with the arrangement of FIG. 1 for a monochrome display.

For a given intended final illuminosity of display, a smaller aperture will require the usage of a higher intensity back light. Of course, a higher intensity back light will require more power in addition to giving off more heat. This is a particular problem with liquid crystal displays designed to be used in portable battery powered systems with the higher power requirements resulting in a shorter battery life.

U.S. Pat. No. 5,124,695 also discloses the use of a metallisation layer in construction of displays in order to reduce energy losses due to the attempt to drive a transparent electrode column of pixels.

European Patent Application No. 361,981 (Nakagawa et al/Sharp) discloses a monochrome pixel arrangement for a liquid crystal display. EP A 361,981 is primarily directed to a pixel pattern, with each pixel containing separate binary weighted luminable areas. One embodiment, FIG. 8c of EP A 361,981, reproduced as FIG. 2 herein, discloses a pixel arrangement in which the centre of illuminosity undergoes substantial movement for each increased level of illumination. A second embodiment, FIG. 10 of EP A 361,981 and reproduced as FIG. 3 herein, discloses a pixel layout pattern where the centre of illuminosity remains substantially constant for each level of illumination. EP A 361,981 does not disclose the use of a metallisation layer, with the electrodes being made up purely of transparent substances. With large panel displays, the need to drive long transparent electrodes makes the resulting display unworkable owing to the high resistivity of the transparent electrodes. With larger display devices, it becomes necessary to use an opaque metallic conductor coupled with any transparent electrode in order to minimise voltages necessary to drive the display.

Additionally, the pixel arrangement disclosed in EP A 361,981 leaves substantial gaps between each electrode where the state of illumination will be undefined. Finally, EP A 361,981 is concerned only with monochrome displays and does not disclose any extension to full colour displays.

The construction of high quality colour displays requires large numbers of pixel patterns to be created in an exacting manner under extreme conditions of cleanliness. Hence, expensive and advanced semiconductor processing techniques are normally required in the construction of such devices and an error in just one of these techniques can render a display unusable.

As each pixel is to be replicated, perhaps several million times, a trade off is presented to the designer of a single pixel. On the one hand there is the requirement to ensure each pixel is as simple as possible, with each additional separately controlled area requiring separate control circuitry and each level of added complexity increasing the likelihood of failure. On the other hand it is of critical importance to reduce or eliminate unwanted artifacts in any displayed image, as these are easily able to be detected by the human observer. One form of artifact is that created through the shift in the optical centre of illumination of a pixel to which the invention disclosed in U.S. Pat. No. 5,124,695 is directed.

An additional competing factor to be considered in the construction of large displays is that, given each pixel is to be of a predetermined size, the more space that is devoted to opaque wiring and other control circuitry, the less the amount of space that is available to those portions of the pixel that are responsible for illumination. For example, in a liquid crystal type display, it is desirable to maximise the areas of the transparent electrodes which are responsible for the illumination, at the expense of the space devoted to the normally opaque driving circuits responsible for conveying signals for the control of the transparent areas.

SUMMARY OF THE INVENTION

It is an object of the present invention to provide an improved form of full colour display that substantially minimises any overall movement of the optical centre of illumination of a pixel while simultaneously providing for an improved tradeoff in the abovementioned factors.

In accordance with a first aspect of the present invention, there is provided a discrete level coloured pixel display having a pixel pattern comprising a multiplicity of pixels with each pixel having a multiplicity of primary colour sub-regions of illumination each of which further comprises a multiplicity of illumination areas, said illumination areas being able to be set to an illuminating state or a non-illuminating state wherein:

(a) the primary colour sub-regions extend in a first direction substantially from one side of the pixel to the other, but in a second direction substantially normal to the first direction have only a limited extent in said pixel;

(b) the illumination areas are arranged to be able to be illuminated with changing intensity with a centre of illuminosity which is substantially stable with respect to movement in the first direction and any movement of said centre of illuminosity is substantially constrained to movement in the second direction.

In accordance with a second aspect of the present invention, there is provided a discrete level coloured pixel display having a pixel pattern comprising a multiplicity of pixels with each pixel having a multiplicity of primary colour sub-regions of illumination each of which further comprises a multiplicity of illumination areas, said illumination areas being able to be set to an illuminating state or a non-illuminating state wherein:

(a) the primary colour sub-regions extend in a first direction substantially from one side of the pixel to the other, but in a second direction substantially normal to the first direction have only a limited extent in said pixel;

(b) the illumination areas are arranged to be able to be illuminated with changing intensity with a centre of illuminosity which is substantially stable and wherein the distance between the centre of illuminosity of any primary colour sub region and the centre of illuminosity of the next adjacent pixel in said first direction is substantially equal to the distance between the said centre of illuminosity of said primary colour sub region and the centre of illuminosity of the corresponding primary colour sub region of the next adjacent pixel in said second direction.

In accordance with a third aspect of the present invention, there is provided a discrete level coloured pixel display having a pixel pattern comprising a multiplicity of pixels with each pixel having a multiplicity of primary colour sub-regions of illumination each of which further comprises a multiplicity of illumination areas, said illumination areas being able to be set to an illuminating state or a non-illuminating state wherein:

(a) the primary colour sub-regions extend in a first direction substantially from one side of the pixel to the other, but in a second direction substantially normal to the first direction have only a limited extent in said pixel;

(b) the illumination areas are arranged to be able to be illuminated with changing intensity with a centre of illuminosity which is substantially stable and wherein the distance between the centre of illuminosity of any primary colour sub region and the corresponding primary colour sub region of any next adjacent pixel is maximised.

BRIEF DESCRIPTION OF THE DRAWINGS

The preferred embodiment of the present invention will now be described with reference to the accompanying drawings in which:

FIG. 2 reproduces the levels possible with a first pixel arrangement illustrated in EP A 361,981;

DESCRIPTION OF THE PREFERRED EMBODIMENT

Investigation of the need to maintain the optical centre of illumination has surprisingly revealed that this need mainly arises as a result of the interference effects that can occur between the illumination present at a given pixel and the illumination present at its surrounding neighbours. The eye is very sensitive to apparent changes in the pixel position and this sensitivity is especially prevalent with respect to the overall illumination position of a pixel in relation to its adjacent pixels and in areas of slowly varying pixel colour.

Figures 4, 5:
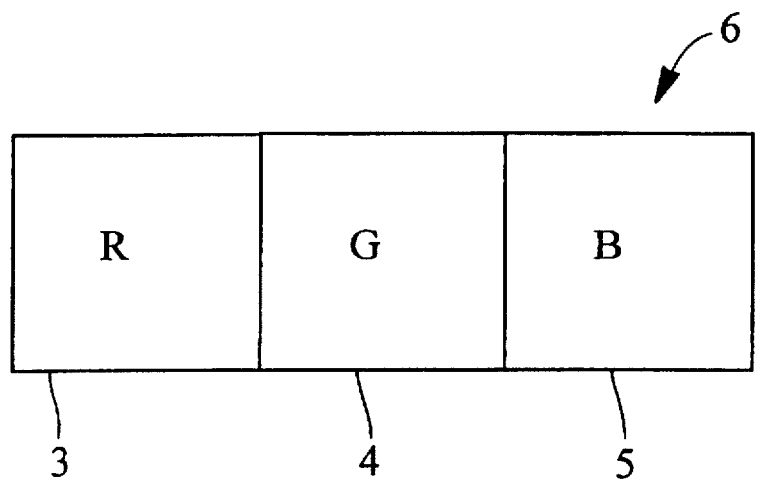
FIG. 4 illustrates a single full colour pixel arrangement suggested by the prior art.
FIG. 5 illustrates a 6×2 array of pixels of FIG. 4.

Referring now to FIG. 4, there is shown a simplified illustration of a pixel 6 of a full colour display constructed in accordance with U.S. Pat. No. 5,124,695. In order to display a predetermined colour, various portions of the red 3. green 4 and blue 5 sub-pixels are illuminated. Unfortunately, as the colour intensity of these sub-pixel portions is altered, so too will be the overall optical centre of illumination. For example, in displaying a mainly red colour the optical centre of illumination will be substantially near the red sub-pixel 3. and in displaying a predominantly blue colour the optical centre will be substantially near the blue sub-pixel 5. Note that for reasons which will be clarified below, it is assumed that the optical centre of illumination of each primary colour sub-portion 3, 4, 5 is substantially at the centre of each of the designated areas.

Referring now to FIG. 5, there is shown a simplified illustration of a 6×2 array of colour pixels 7, with each pixel constructed in accordance with that suggested by FIG. 4. Considering now the consequences of failing to properly center each level of illumination, by way of example, in considering a red sub-pixel 8, it can be seen that the anti-symmetries of the pixel layout are such that movement of the optical centre of the red sub pixel 8 in a horizontal direction with differing levels of red colour illumination interferes very little with a corresponding red sub pixel 11 in the next column of pixels of the display. However, movement of the optical centre of red sub pixel 8 with respect to the red sub pixel 10 in the row above will create substantial interference effects due to their close proximity. As a result, movements of the optical centre of the red sub pixel 8 in the row direction will result in minimal interference effects with its neighbour 11 whereas movement of the optical centre in a vertical direction will result in substantial interference effects with its neighbours 9 and 10. This means that, firstly, the need to maintain optically balanced pixels can be relaxed in the horizontal direction in this arrangement, with this condition relaxation resulting in improvements in other conditions such as wire routing, pixel design or aperture ratio.

Figure 6:
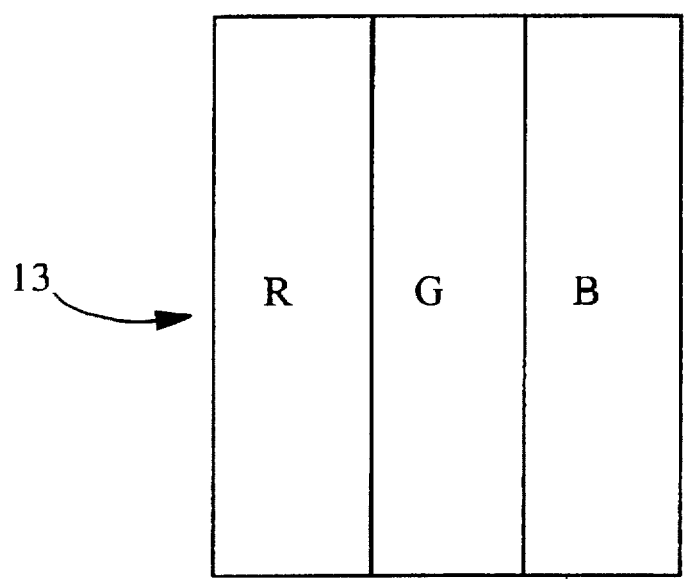
FIG. 6 illustrates a single pixel formed in accordance with one embodiment of the present invention.

Further, referring now to FIG. 6, there is shown a first improved pixel arrangement 13. In this arrangement the vertical dimension has been stretched with respect to the horizontal dimension, with the actual overall area occupied by the overall pixel remaining constant. By stretching in the vertical dimension, there will be a corresponding distancing of the centre of illumination of optical pixels in the vertical direction at the expense of a reduction in the optical centres in the horizontal direction.

Figure 7:
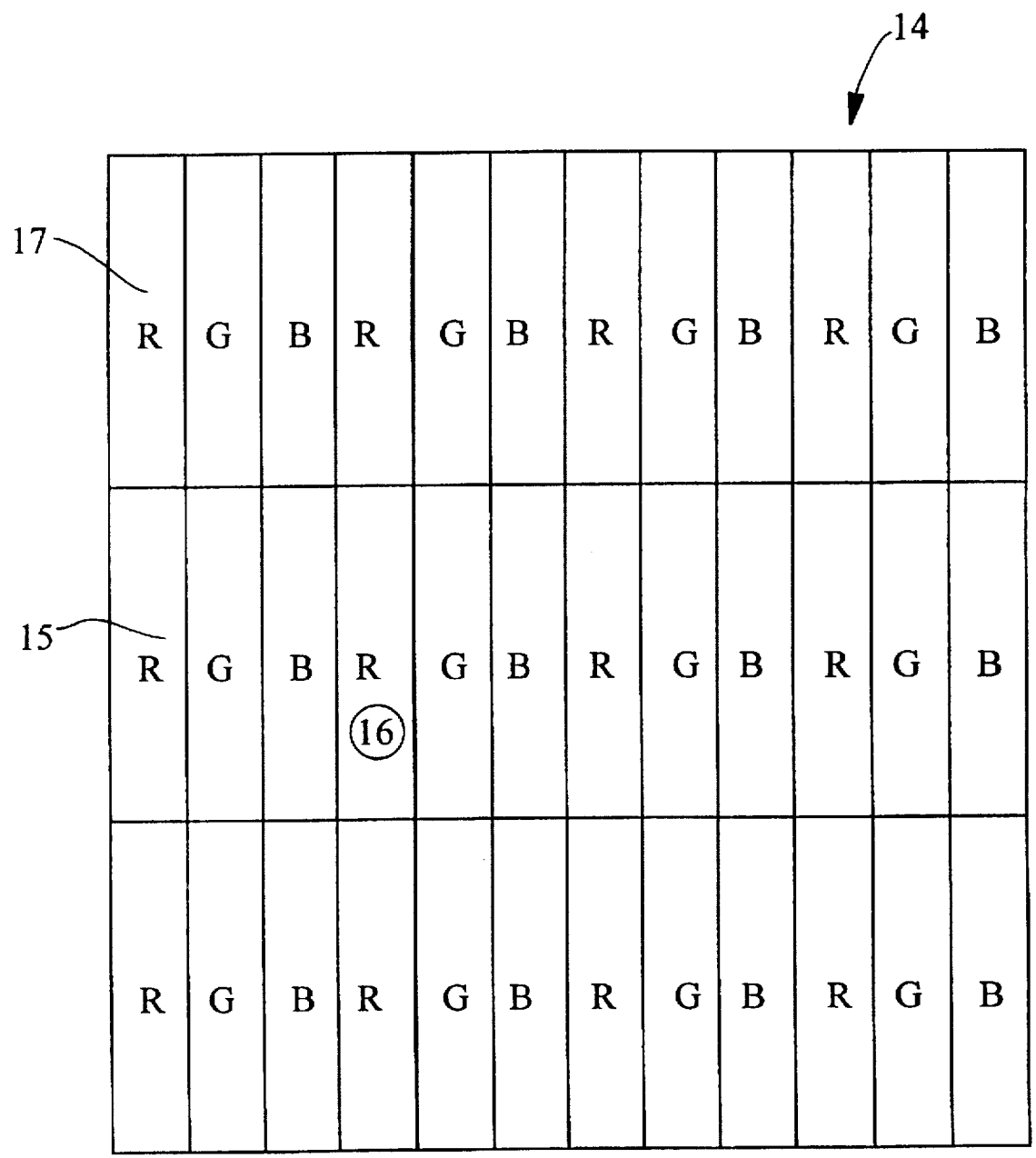
FIG. 7 illustrates a 3×4 array of pixels of FIG. 6.

Referring now to FIG. 7, there is shown an array of 3×4 pixels 14, with each pixel constructed in accordance with FIG. 6. The optical centre of red sub pixel 15 is now closer to the optical centre of red sub pixel 16 on the same row but in the next column. Additionally, the optical centre of red sub pixel 15 is further away from the optical centre of the red sub pixel 17. The elongation of the pixel structure has resulted in a distancing of optical centres of illumination in the column direction at the expense of a shortening of the distance between optical centres in a row direction. However, as the array 14 comprises full colour pixels, the distance between red sub-pixel 15 and its row neighbour 16 is still substantial.

This preferred pixel arrangement of maximising the distance between the optical centres of neighbouring sub-pixels in column direction is of significant importance in reducing unwanted artifacts in images as a result of any movement of optical centres. By distancing the proposed optical centres of illumination of each of the subpixel portions e.g. 15 from those of its neighbours, it is possible to partially relax the requirement for fully optically balanced subpixels while not introducing the distracting artifacts associated with a non-optically balanced pixel arrangement.

Therefore, in a first example embodiment, the need to ensure that the optical centre of illumination of a pixel remains constant in a horizontal direction is relaxed. The first embodiment of the present invention will now be described in relation to a ferro-electric liquid crystal display, however it should be noted that the present invention is not limited thereto, applying equally to other forms of discrete level displays such as anti ferroelectric liquid crystal displays, plasma panel displays or electro-luminescent displays.

Figure 8:
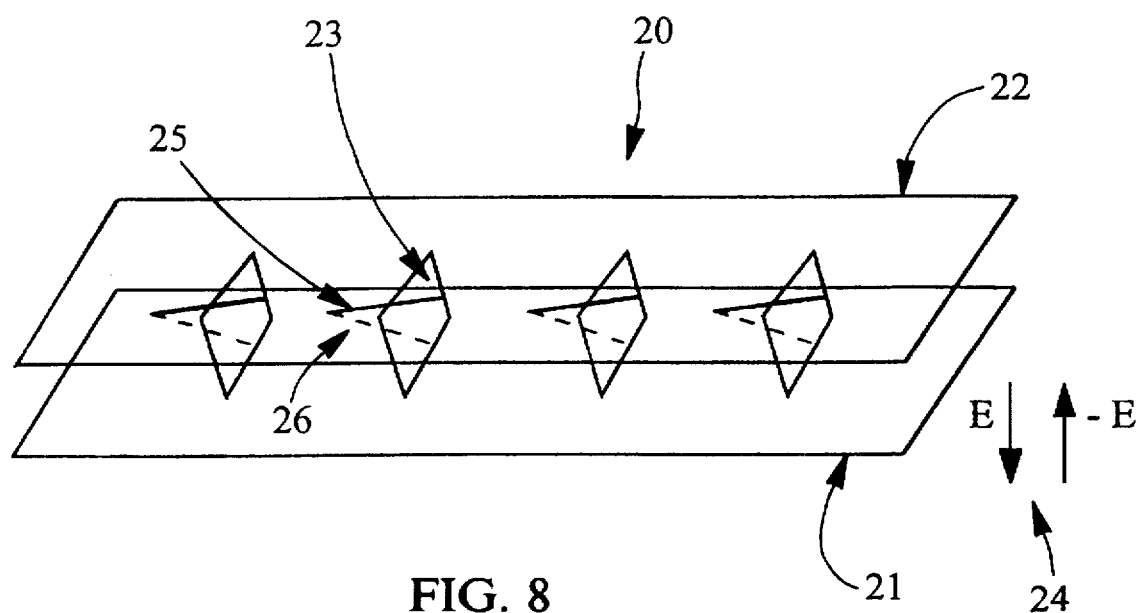
FIG. 8 illustrates a schematic perspective view of the operation of a ferroelectric liquid crystal device.

Referring now to FIG. 8 there is illustrated the basic operation of a ferroelectric liquid crystal display device (FLCD) 20 which comprises a pair of electrode plates (normally consisting of glass substrates coated with a transparent form of electrodes) 21 and 22 and a layer of ferro electric liquid crystal having molecular layers 23 disposed between and perpendicular to the electrode plates. The ferroelectric liquid crystal assumes a chiral smectic C phase or an H phase and is disposed in a thickness thin enough (e.g: 0.5–5 microns) to release the helical structure inherent to the chiral smectic phase.

When an electric field E (or –E) 24 exceeding a certain threshold is applied between the upper and lower substrates 21, 22 liquid crystal molecules 23 are oriented in accordance with the electric field. A liquid crystal molecule has an elongated shape and shows a refractive anisotropy between the long axis and the short axis. Therefore if the ferroelectric liquid crystal device 20 is sandwiched between a pair of crossed polarisers (not shown) mounted on the glass substrates 21, 22, there will be provided a liquid crystal light modulation device.

When an electric field 24 exceeding a certain threshold is applied the liquid crystal molecules 23 are oriented to a first polarisation orientation state 25. Further, when a reverse electric field (–E) is applied, the liquid crystal molecules 23 are oriented to a second polarisation orientation state 26. These orientation states are further retained as long as the electric field which is applied, does not exceed a certain threshold in the reverse direction.

Figure 9:
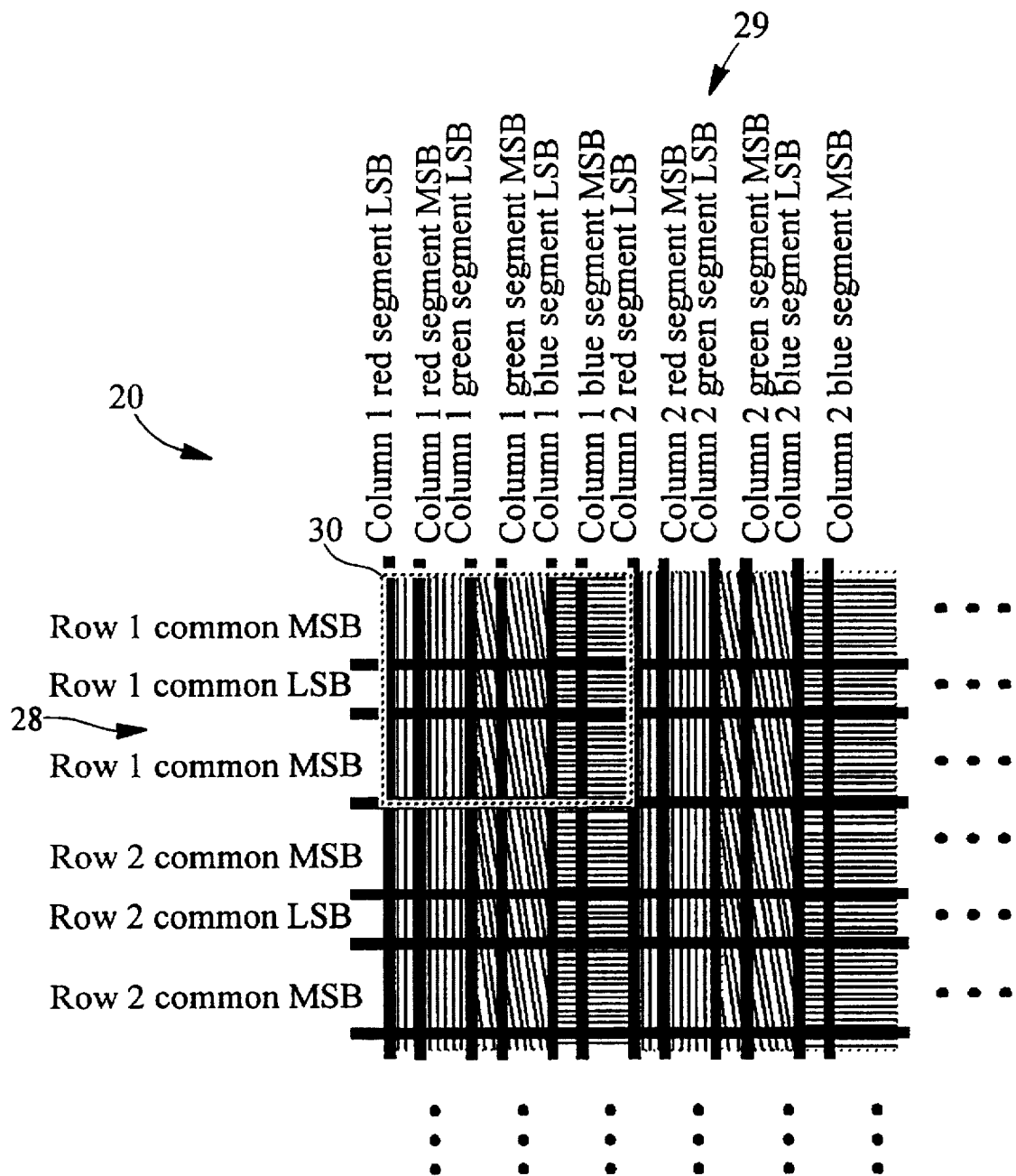
FIG. 9 illustrates an array of pixels of the preferred embodiment.

Referring now to FIG. 9, there is shown a portion the pixel layout of a liquid crystal device 20 according to the preferred embodiment. The liquid crystal display 20, is designed for the high resolution display of full colour images and includes a substantial number of common lines and corresponding common transparent electrodes 28 laid out on a first substrate. The common lines are electrodes laid substantially perpendicular to a large number of data drive lines and data transparent electrodes 29 formed on a second substrate in the manner as will be hereinafter described.

Common sizes for high resolution computer displays included displays having 1024 distinct rows of pixels each divided into 1280 distinct columns of pixels, with one set of lines formed on a first glass substrate and the other set of drive lines formed on a second glass substrate. At the intersection of these rows and columns are formed pixels indicated by the box 30. In the preferred embodiment of the present invention, each pixel of the display has more than one drive line and more than one common line associated with it.

Figure 10:
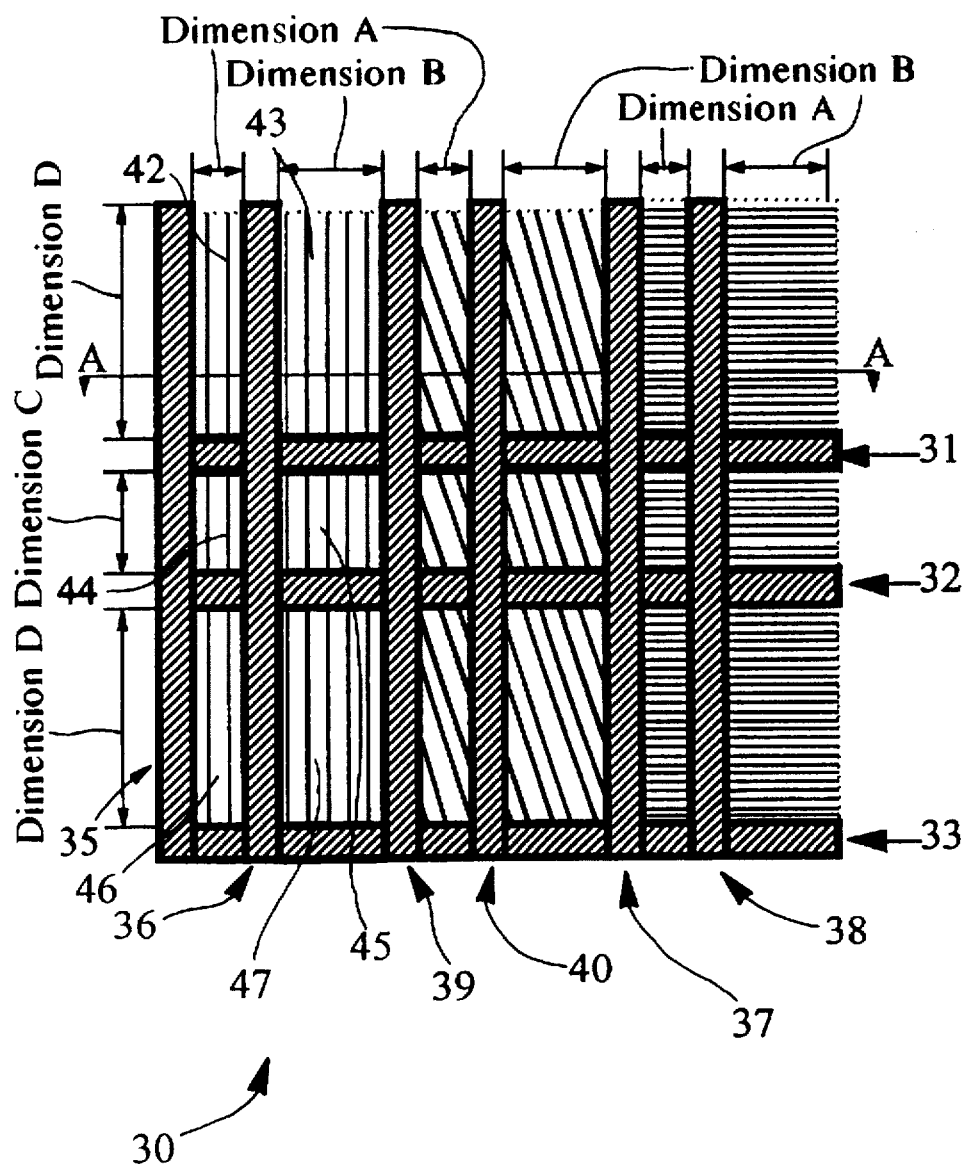
FIG. 10 illustrates a single pixel constructed in accordance with the preferred embodiment.

In particular, with reference to FIG. 10 wherein there is shown the layout of a single pixel 30, each pixel 30 has three common drive lines 31, 32, 33 with the outer two common drive lines 31, 33 being optionally electrically connected together at the edge of the display. Similarly, each pixel has multiple data lines, divided into red data drive lines 35, 36, green data drive lines 39, 40 and blue data drive lines 37, 38.

The data drive lines are treated symmetrically for each colour and, as such, only the operation of the red data drive lines 35, 36 will now be described. The red data drive lines 35, 36 control the transparent electrode areas 42–47. The first red data drive line 35 controls the transparent electrode areas 42, 44, 46 and the second data drive line controls areas 43, 45 and 47.

Preferably, each transparent electrode area 42–47, which is able to be independently driven, forms a binary area relationship with other areas. For example, area 44 is 1 square unit, area 45 is 2 square units, areas 42 and 46 together form a 4 square unit area, and areas 43 and 47 form an 8 square unit area. Therefore, in driving combinations of the drive lines and the common lines, and remembering that the outer drive lines 31 and 33 are preferably electrically connected together, 16 possible levels for each primary colour of the pixel 30 can be achieved or $16^3=4096$ different colours per pixel 30. Of course, by forming such a binary relationship in illumination areas, substantially more levels can be achieved than if the areas were to be all of the same size.

Figure 11:
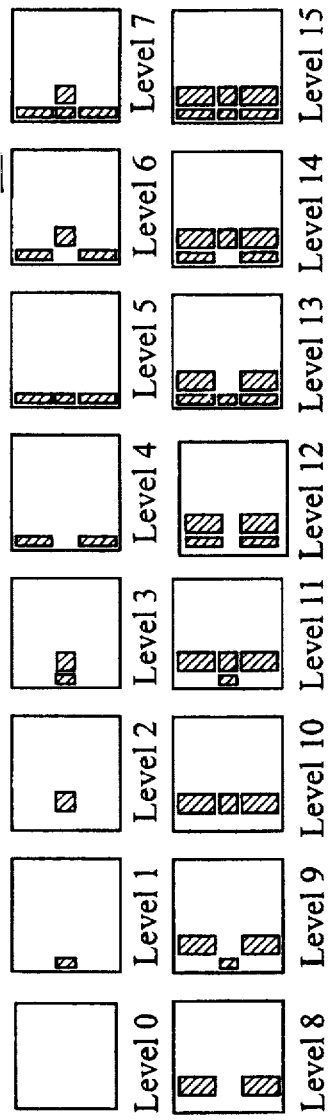
FIG. 11 illustrates the number of possible levels available for the red portions of a pixel.
Figure 12:
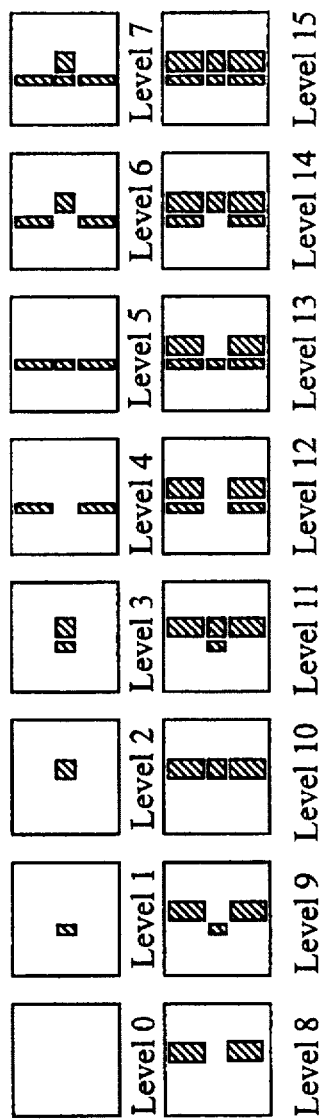
FIG. 12 illustrates the number of green levels available with the pixel arrangement of the preferred embodiment.
Figure 13:
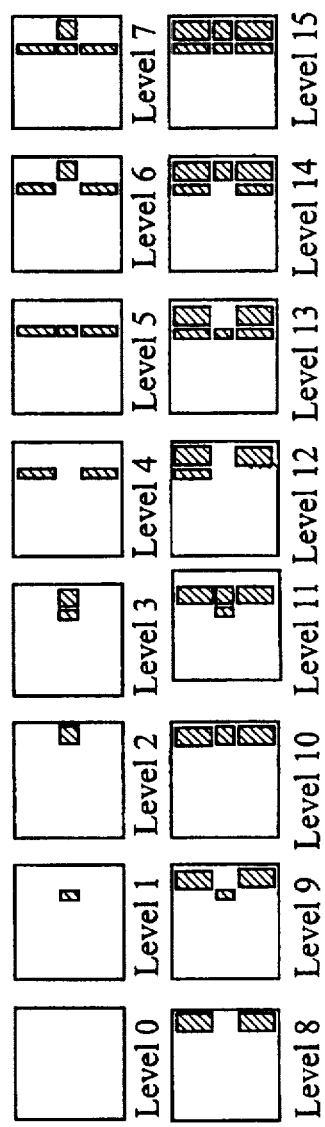
FIG. 13 illustrates the number of blue levels available with the pixel arrangement of the preferred embodiment.

Referring now to FIG. 11, the 16 possible levels for the red primary colour of the pixel 30 are shown. Similarly FIG. 12 and FIG. 13 show the 16 possible levels for the green primary colour and the blue primary colour respectively. In combination, each pixel of the preferred embodiment is therefore able to display 4096 different possible colours.

As can be seen from observation of the patterns produced in FIG. 11 to FIG. 13, the optical centre or the centre of illumination of each primary colour, as the primary colour's intensity is increased from level to level, remains substantially in the same position. The need to minimise the movement of the optical centre of illumination of the pixel intensity as the intensity is increased is an important consideration in the removal of unwanted artifacts in pictures displayed on an FLCD device, and it is primarily for this reason that the two outer common lines have been provided however, as discussed previously, the optical centering process has been slightly relaxed in the horizontal direction.

The common lines 31, 33 can be optionally connected together at the edge of the device using a number of methods. The selection of the common lines 31, 33 is made in the time period different from that of the common line 32. The preferable method of connecting common lines 31, 32 is to duplicate the logical circuitry and various bonding pads required for the interconnected drive lines and drive both lines with the same decoded signal. Alternatively, the drive lines can be electrically connected on a Tape Antomated Bonding (TAB) flexible Printed Circuit Board (PCB), by using double sided TAB traces.

Manufacturing

Although the present invention applies to all forms of displays, the manufacture of a ferro electric display having a pixel layout in accordance with FIG. 10 will now be described.

The manufacturing processes utilised in the display construction are very similar to those used in the construction or fabrication of Very Large Scale Integrated Circuit Devices (VLSI) and familiarity with the constructions of such devices is assumed.

Figure 14:
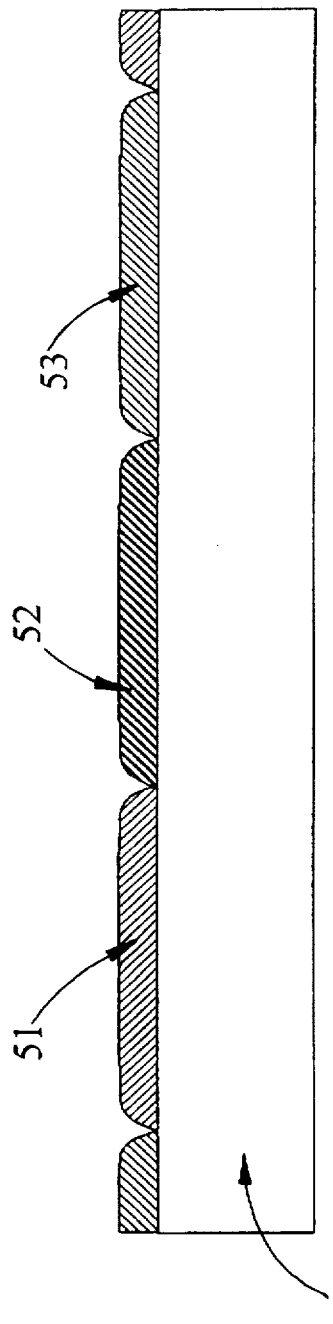
FIG. 14 is a cross sectional view of the construction of the colour filter layer of the preferred embodiment.

The construction of a FLCD display begins with the two glass substrates. Referring initially to FIG. 14, the construction of the top glass substrate 22 will now be described.

Colour Filters

After the surface of the substrate has been thoroughly cleaned, an aluminium chelate coupling agent (not shown) can be applied to ensure the proper adhesion to the glass of subsequent layers to the glass substrate.

Figure 15:
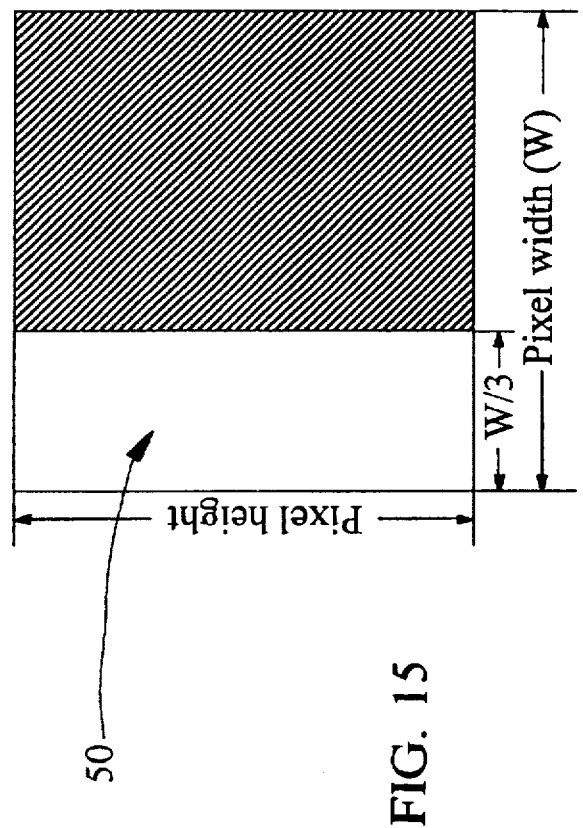
FIG. 15 is a plan view of the colour filter mask used in construction of the colour filter layer.

A spin coating process is then used to apply a 1.5 μm layer of photosensitive polyamide containing a primary colour die, which in the first case will be red. To remove residual solvents, the polyamide is pre-baked for approximately 10 minutes at 80° C. The photosensitive polyamide is then exposed using a pixel mask as shown in FIG. 15, with the aperture 50 corresponding to the area of the red colour filter 51 to be exposed. The polyamide layer is then developed leaving the red colour filter portions 51 of each pixel on the substrate 22. This first colour filter portion is then post baked to form a stable structure before the process is repeated for the green filter 52 and blue filter 53, with appropriate masks (not shown) whose aperture is appropriately shifted by a one third pixel width.

Data Level Metal Layer

Figure 16:
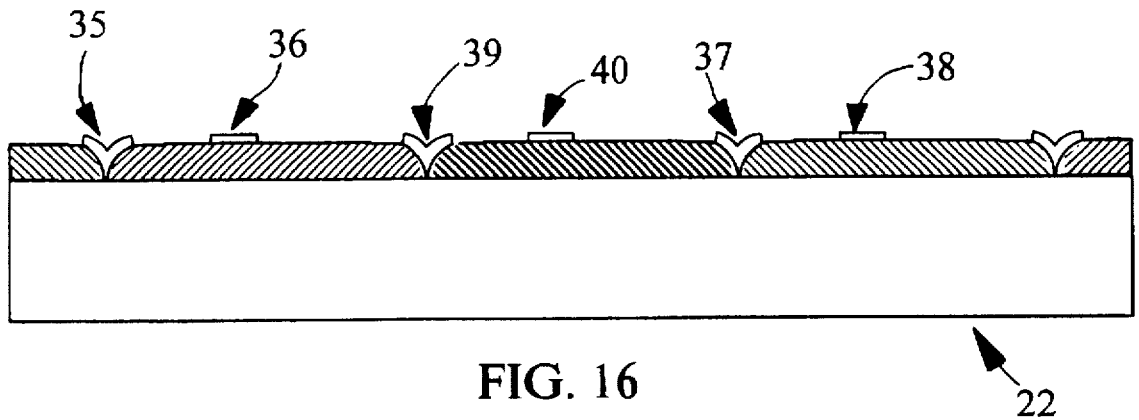
FIG. 16 is a cross sectional view of the construction of the data level metal layer of the preferred embodiment.

Referring now to FIG. 16 the next portion of the display device constructed is preferably the data level metal layer 35–40. The deposition of this metal layer occurs directly over the colour filters.

In the construction of devices using metal layers, the use of Molybdenum (Mo) has been preferred for the formation of the relevant circuitry. Molybdenum is preferred due to its superior patterning properties and planarisation properties.

Aluminium is also a possible candidate for use in patterning of the metal layer. The resistivity of aluminium is 0.027 μΩm at 25° C., whereas the resistivity of molybdenum is 0.0547 μΩm at 25° C. Hence a metal conductive layer made of aluminium is almost twice as conductive as one made of molybdenum. However, hillock or spike formation in aluminium, as a result of stress release during differential thermal expansion of aluminium, in comparison with other substances used in the creation of the display, creates a serious problem with prior forms of displays which currently prevents the use of aluminium.

As the distance between substrates is of the order of 1–2 μm, a hillock in the metal layer of this order or greater may result in substrate separation beyond specifications resulting in a defective panel. The manufacturing method does not eliminate the formation of hillocks. However, by positioning the data metal layer on top of the colour filter layer and covering the data metal layer with a 2 μm planarised dielectric layer (to be described below), the affect of hillock formation can be significantly reduced as most of the hillocks will be absorbed within the dielectric layer. Of course, extremely large hillocks (greater than 3 μm) will still cause panel separation.

The deposition of a metal layer is well known to those skilled in the art of semiconductor circuit fabrication and an example process for such deposition will now be described.

Figure 17:
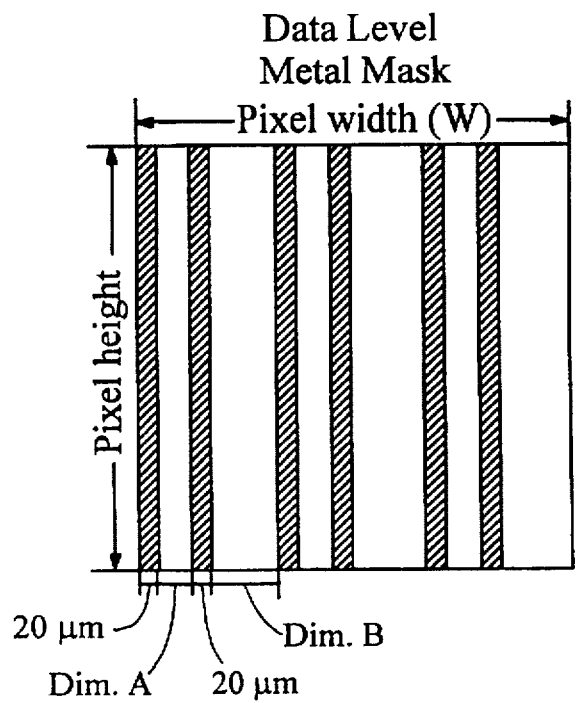
FIG. 17 is a plan view of the data level metal mask used in construction of the data metal layer.

A 0.3 μm layer of a Aluminium and 0.5% Copper (AlCu) alloy is first sputtered onto the surface of the substrate. Preferably the aluminium is planarised to a 0.09 μm surface height difference. The sputtered aluminium layer is then primed for photoresist adhesion by spin coating a monolayer of hexamethyldisilazane (HMDS). A 1 μm layer of positive photoresist such as AZ1370 is then spin coated on top of the priming layer. The photoresist is then pre-baked for 3 minutes at 90° C. using an infra-red oven. The photoresist is then exposed using the pixel mask shown in FIG. 17, which comprises simple vertical stripes corresponding to the various areas of the data metal layer 35–40. The photoresist is exposed to the metal mask at 35 mJ/cm².

The photoresist can then be developed for 50 seconds at 23° C. in 25% aqueous solution AZ-351 and 40% aqueous solution AZ-311. A development inspection can then take place before the resist is stripped and any out of tolerance panels are either discarded or reworked. The photoresist can then be post-baked at 150° C. before the sputtered aluminium is wet etched in an agitated solution of 80% phosphoric acid, 5% nitric acid, 5% acetic acid and 10% water at 40° C. for 2 minutes.

Finally the remaining photoresist is stripped using a low phenol organic stripper such as Shipley remover "1112A", leaving the data level metal layer 35–40 on the bottom substrate 22.

Data Level Dielectric Layer

Figure 18:
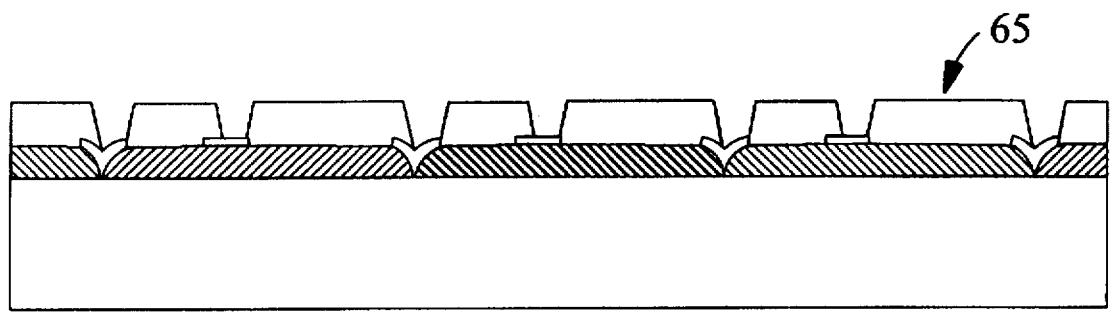
FIG. 18 is a cross sectional view of the construction of the formation of the data level dielectric layer of the preferred embodiment.

Referring now to FIG. 18, there is shown the data level dielectric layer 65. This layer is formed from a simple photosensitive polyamide process. The processing steps that can be used to form this layer include the spin coating of a 2 μm of a photosensitive transparent polyamide layer. Preferably a good planarisation is obtained through the use of a ester oligomer solvent with 50% resin content rather than the more usual PIQ polyamide acid method.

Figure 19:
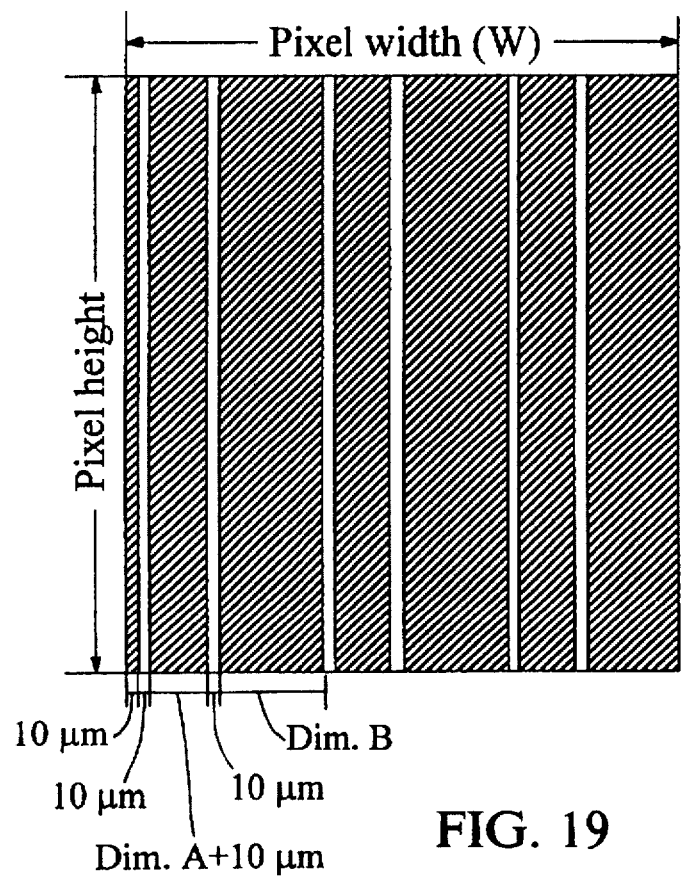
FIG. 19 is a plan view of the data level dielectric pixel mask used in the construction of the data level dielectric layer.

The polyamide is then prebaked for 10 minutes at 80° C. The polyamide is then exposed using the mask as shown in FIG. 19, before being developed and post-baked to ensure that the final dielectric layer 65 takes the form as shown in FIG. 18.

Data Level Transparent Electrode Layer

Figure 20:
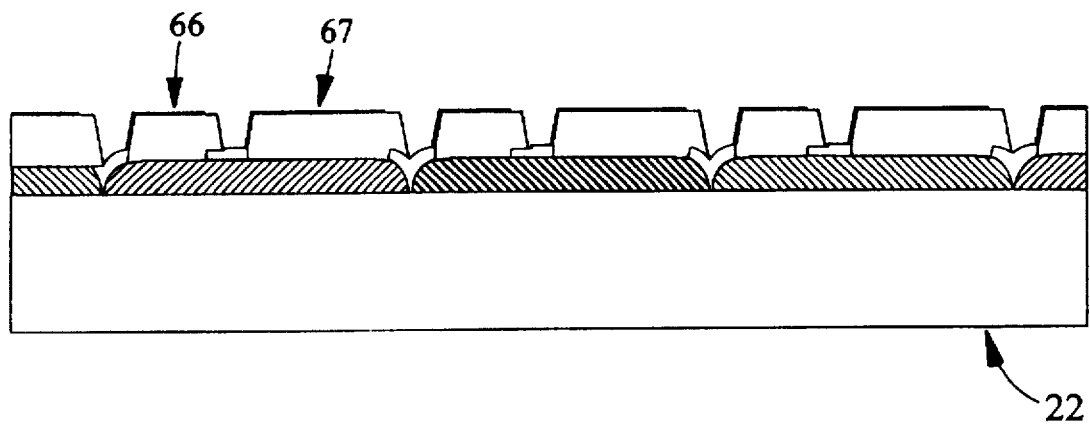
FIG. 20 is a cross sectional view of the construction of the data level transparent electrode layer of the preferred embodiment.

Referring now to FIG. 20, there is shown the data level transparent electrode layer including first portions 66, 67 controlling the red primary colour area. This layer is formed by applying a transparent electrode such as ITO (Indium Tin Oxide) on the substrate 22.

Although a functional display could be produced with the data level transparent layer being formed initially on the colour filter layer and the data level metal layer being formed on top of the data level dielectric layer, the preferred embodiment includes the data level dielectric layer being created before the data level transparent layer. This has the advantage that the data level transparent layer is created very close to the liquid crystal portion upon which it operates. Hence the electric field created between an adjacent data level transparent electrode and a corresponding common level transparent electrode is substantially increased.

The process of formation of the data level dielectric layer includes the sputtering of indium and tin in an oxygenated atmosphere to initially form a 0.07 μm layer of ITO. This layer of ITO is then primed, again by spin coating a monolayer of HMDS. On top of this layer is spin coated a 1 μm layer of positive photoresist such as AZ1370. The photoresist can then be pre-baked, to remove solvents, for approximately 3 minutes at 90° C. using an infra-red oven.

Figure 21:
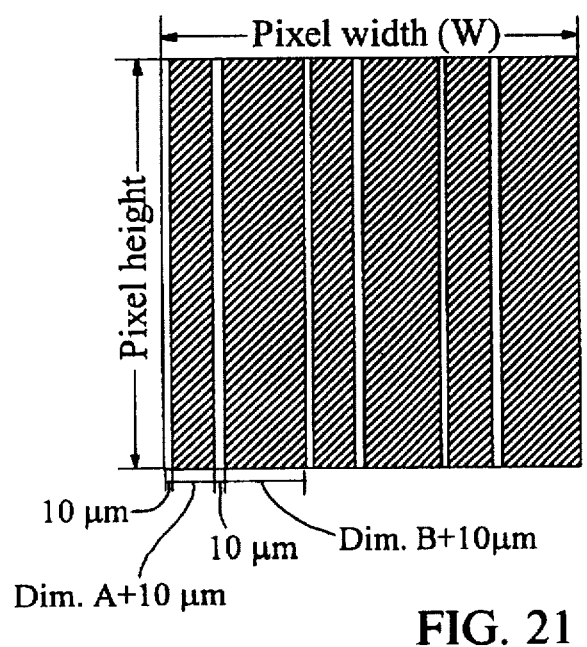
FIG. 21 is a plan view of the data level transparent electrode mask used in the formation of the data level transparent electrode layer.

The photoresist is then exposed to the data level electrode mask as shown in FIG. 21 at an energy of approximately 35 mJ/cm². The photoresist is developed for 50 seconds at 23° C. in a 25% aqueous solution AZ-351 and a 40% aqueous solution AZ311. The photoresist is then post baked at 120° C. The ITO is then wet etched and the remaining photoresist is stripped using a low phenol organic stripper such as Shipley 'Remover 1112A' leaving the data transparent electrode layer connected to the data metal layer.

Figure 22:
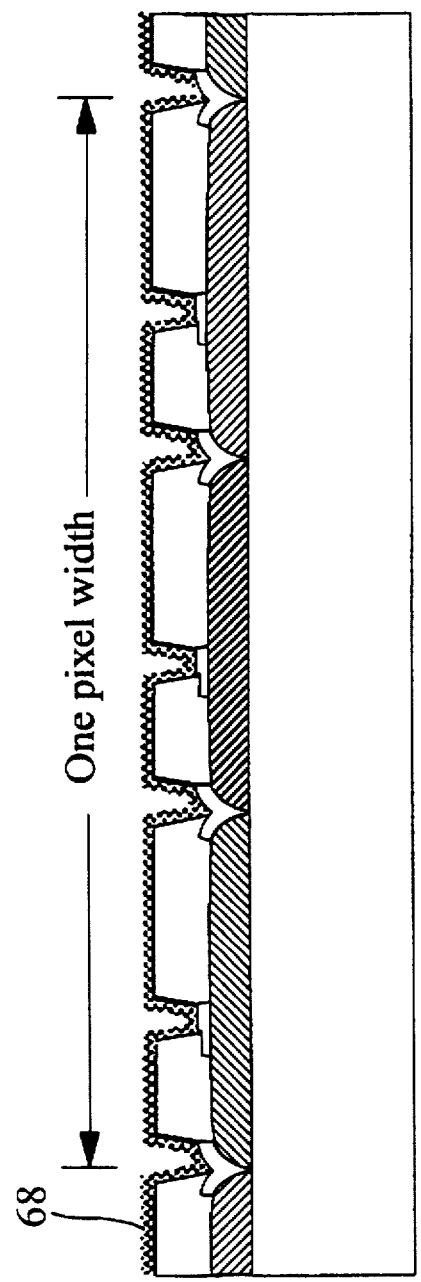
FIG. 22 is a cross sectional view of the construction of the data level surface layers of the preferred embodiment.

Referring now to FIG. 22, the surface layers 68 can then be applied. This includes the sputtering of 0.1 μm of a tantalum pentoxide insulator, the application of 0.1 μm of silicon titanium oxide, the spin coating of 0.02 μm of polyamide which is then post baked and the surface rubbed for the proper liquid crystal molecule alignment.

The second substrate 21 (FIG. 8) is laid out in the same manner as the first substrate but for different masks being used and the dispensing of the colour filter layer.

Figure 23:
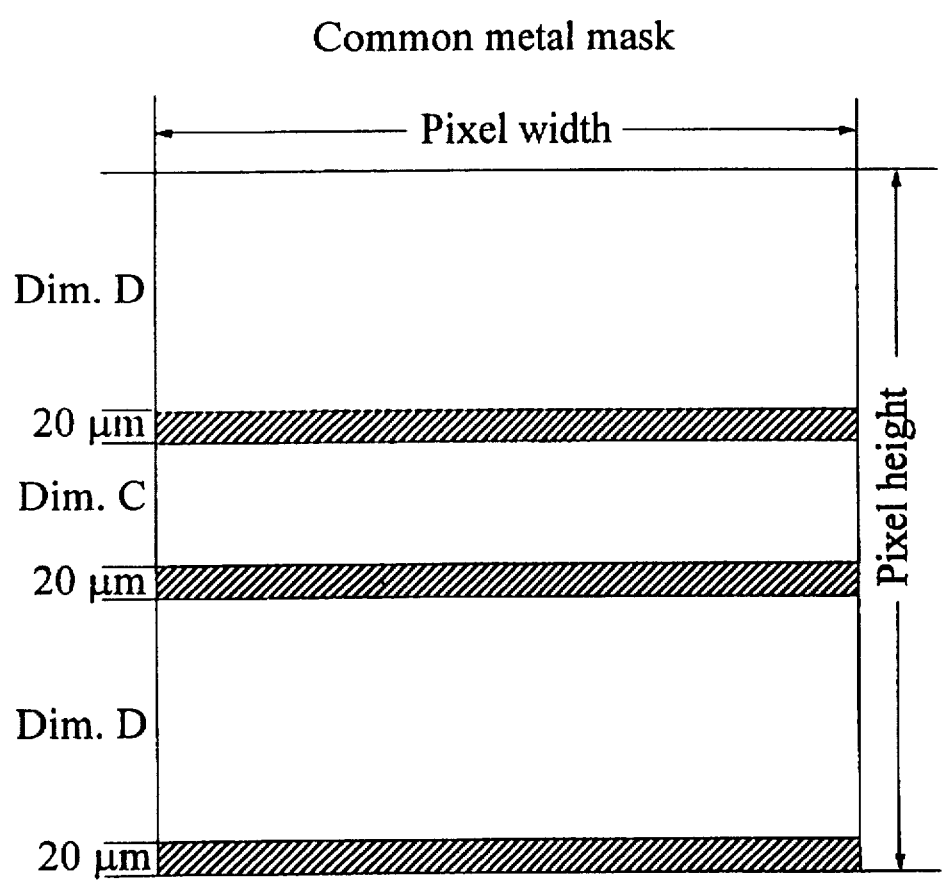
FIG. 23 is a plan view of the common level metal mask used in the construction of the common level metal layer.
Figure 24:
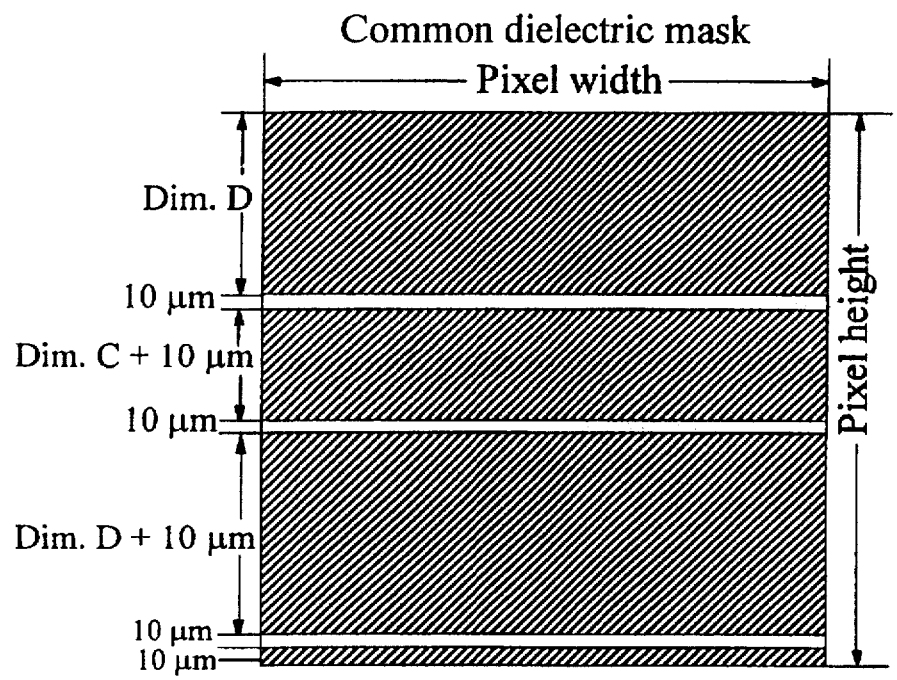
FIG. 24 is a plan view of the common level dielectric mask used in the construction of the common dielectric layer of the preferred embodiment.
Figure 25:
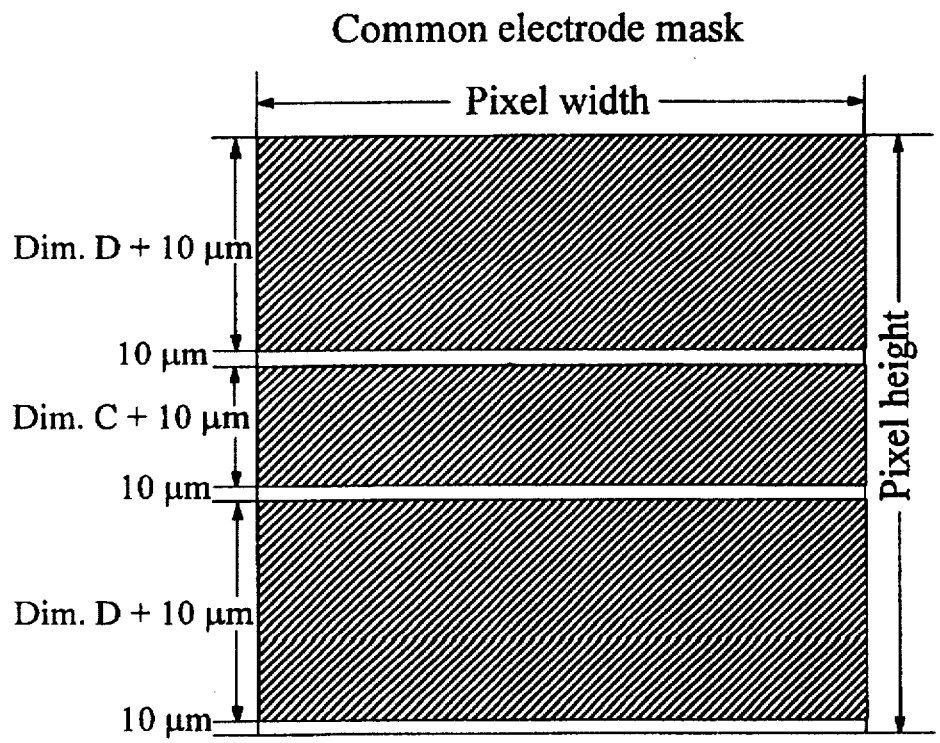
FIG. 25 is a plan view of the common level electrode mask used in the construction of the common transparent electrode layer of the preferred embodiment.

After the surface of the substrate has been thoroughly cleaned, a common metal layer, a common dielectric layer, a common transparent electrode layer and the various surface layers are laid down with the common metal mask as shown in FIG. 23, the common dielectric mask as shown in FIG. 24, and the common electrode mask as shown in FIG. 25.

Figure 26:
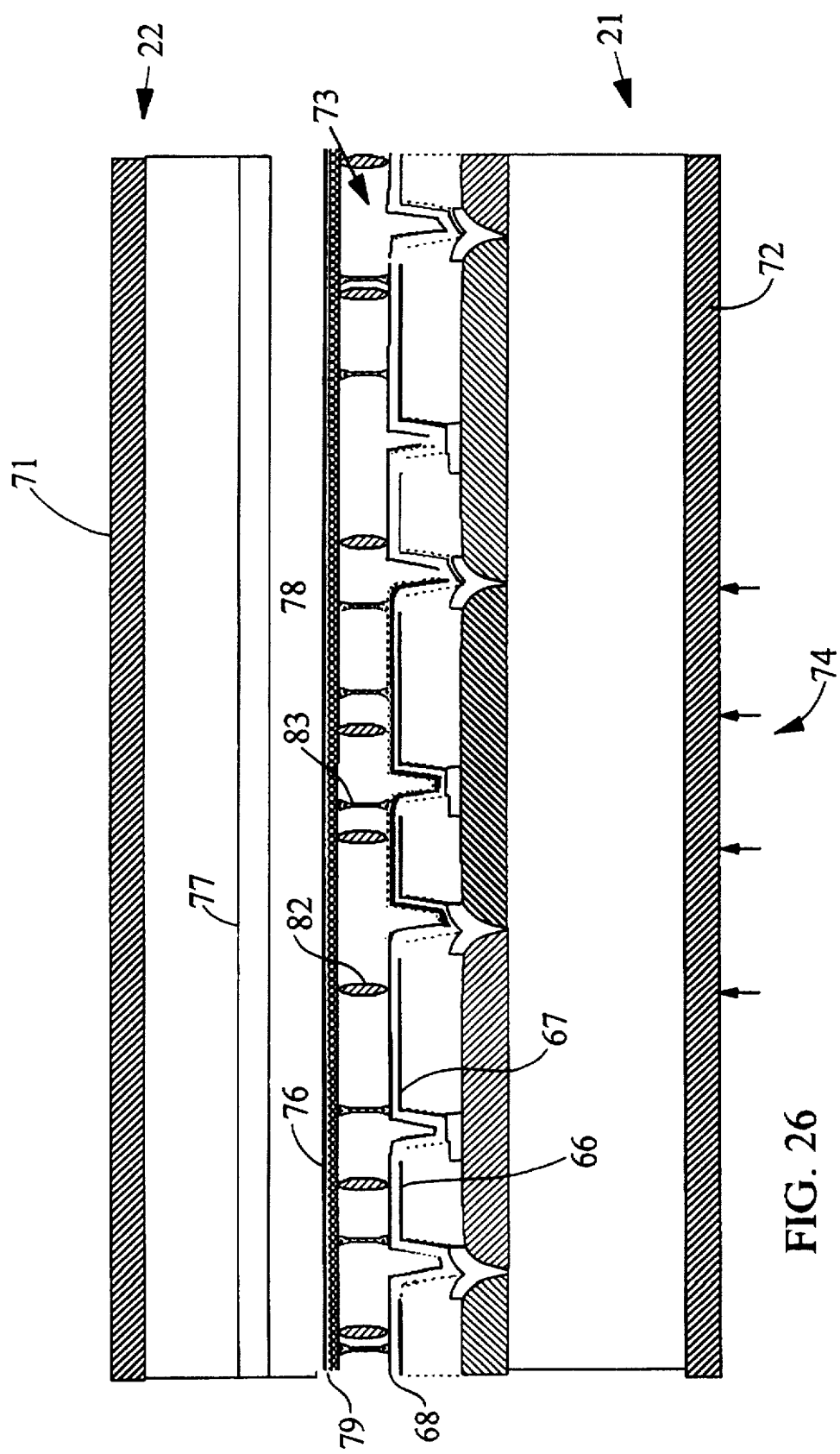
FIG. 26 is a cross-section of a pixel through the line A—A of FIG. 10.

Referring now to FIG. 26 there is shown a final cross-section of a pixel 30 of the display taken through the line A—A of FIG. 10. In order to better illustrate the preferred embodiment, the approximate scale of the cross-section has been magnified in the vertical direction.

This cross-section includes the upper 22 and lower 21 glass substrates as previously described. On each glass substrate is deposited polarising film 71, 72, which, depending on the required driving mechanisms, can have either parallel or perpendicular polarising axes with respect to one another.

Layers deposited on the substrates are designed to create a transparent electrode portion for the particular transparent area required, in addition to a supply means for delivering a voltage source to the transparent electrode so that the required electric field can be set up between the top substrate 22 and the bottom substrate 21, and so that the liquid crystal 73, sandwiched between the substrates, can be forced into its relevant bistable state.

As mentioned previously, the bistability is with respect to the liquid crystal's influence on the polarisation of light. Hence, light 74 is shone through the panel by means of a backlight (not shown), and is polarised by the bottom substrate polariser 72. It then has its polarisation state changed depending on the bistable state of the liquid crystal 73, before passing through the second polarising film 71 which, depending on the required driving arrangement, may have its polarisation axis at right angles to, or parallel to, the bottom substrate polariser 72. Hence, depending on the state of the crystal 73, which is preferably of a ferro electric liquid crystal type, the light will be either blocked or transmitted by the combination of the polarisers 71, 72 and liquid crystal 73.

The state of the liquid crystal 73 is altered, as previously mentioned, by setting up electric fields between the transparent electrodes of the top and bottom substrates. This is done primarily by means of intersecting portions of transparent electrodes. For example, a top common transparent electrode 76 and a bottom data transparent electrode 66, 67. These transparent electrodes comprise, approximately 0.7 μm thick of Indium Tin Oxide (ITO) connected to a 0.7 μm metal voltage supply line. The common level transparent layer 76 is connected to corresponding portions of common metal layer 77 which include the common metal lines 31–33 of FIG. 10. The data or segment level transparent layer e.g. 66, 67 is connected to corresponding portions of the data level metal layer which includes the data metal lines 35, 36 of FIG. 10.

The transparent common electrode layer 76 is insulated from an adjacent common metal electrode 77 by means of a common dielectric layer 78. Additionally, it is necessary to insulate the common transparent layer 76 from the liquid crystal itself. This insulation is provided by a 0.1 μm insulation layer 79 made up of Tantalum Pentoxide ($Ta_2O_5$).

A 0.1 μm layer of Silicon Titanium Oxide (SiTiO$_x$) 80 is then provided to smooth out any irregularities in the surface of the substrate. An alignment layer 81 comprising approximately 0.02 μm of polyamide is then formed with the alignment layer being formed by laying down the polyamide layer and then rubbing the surface thereof in one direction with velvet, cloth, paper etc. As mentioned previously, the various layers are also replicated on the bottom substrate 21 with the addition of the colour filter layer.

The two substrates 22, 21 are held apart by 1.5 μm glass spheres 82. These spheres are shown elongated due to the scaled dimensions of the panel. Sphere densities in the order of 100 spheres per square millimeter are appropriate. The substrates are held together by adhesive droplets 83, so that between the droplets 82 and the spheres 83, the panel is kept in a static equilibrium with the thickness of the liquid crystal being of the order of 1.5 μm, being the diameter of the spheres 82.

Sub-Pixel Dimensions

As mentioned previously, the display of images is normally in accordance with predetermined standards. For example, a standard used with CRT type displays in common use with computer terminals is to display images with a resolution of 1,280 pixels by 1,024 lines. An image that is stored with reference to the above display format can be displayed on a variety of display sizes, in a similar manner that television displays come in a variety of display sizes and yet all display the same image. The difference is in the actual size of each pixel.

Figure 27:
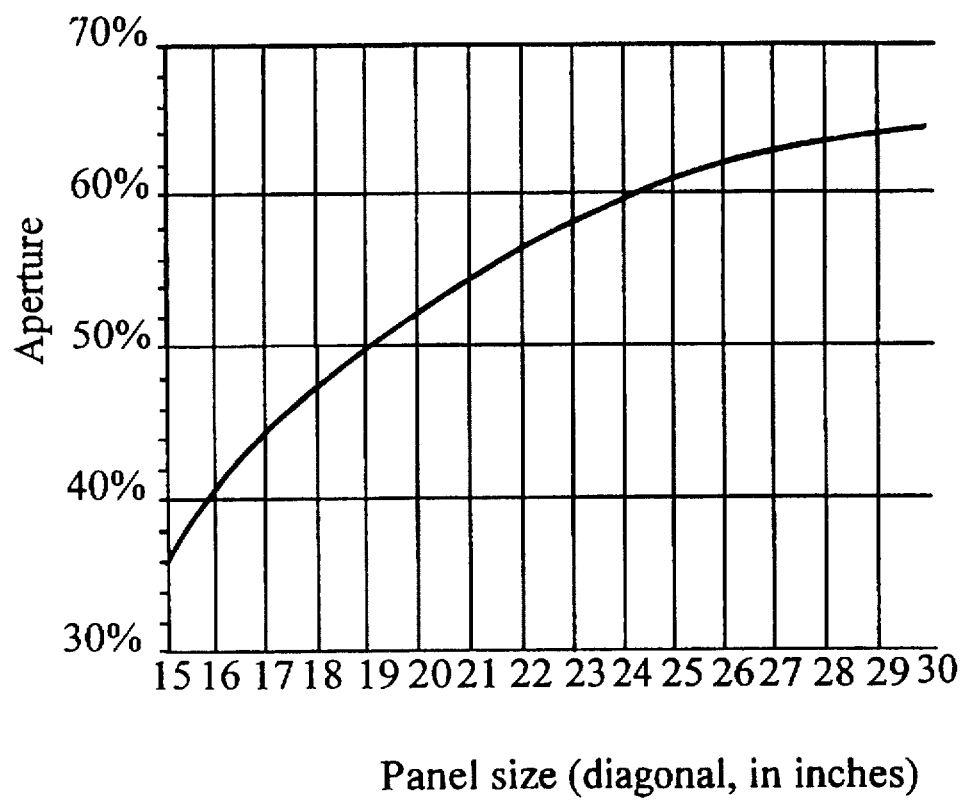
FIG. 27 illustrates a graph of the aperture of a colour panel constructed in accordance with the preferred embodiment with respect to the panel size.

In the preferred embodiment, different sized pixels can be achieved by altering the area of the transparent electrode areas. With reference to FIG. 10, the dimensions A, B, C and D can be altered depending on the desired pixel size. Preferably the width of the metal lines are kept constant at 20 μm although this width will be dependent on the manufacturing process used. Table A below shows the various sizes (in microns) of the dimensions A, B, C, D for different sized displays, with the measurement for the display measured along its diagonal and the dimensions of the relevant pixel areas shown to the nearest 0.1 micron. FIG. 27 illustrates a graph of the corresponding aperture ratio of the colour FLCD display utilizing the data set out in Table A.

TABLE A

Dimensions For Various Pixel Sizes

| Panel size Inches (cm) | Metal width (μm) | Dim. A (microns) | Dim. B (microns) | Dim. C (microns) | Dim. D (microns) |
|---|---|---|---|---|---|
| 15 (38) | 20.0 | 12.5 | 25.0 | 34.5 | 69.0 |
| 16 (40) | 20.0 | 14.2 | 28.4 | 37.6 | 75.2 |
| 17 (44) | 20.0 | 15.9 | 31.9 | 40.7 | 81.4 |
| 18 (44) | 20.0 | 17.7 | 35.3 | 43.8 | 87.6 |
| 19 (45) | 20.0 | 19.4 | 38.8 | 46.9 | 93.8 |
| 20 (51) | 20.0 | 21.1 | 42.2 | 50.0 | 100.0 |
| 21 (53) | 20.0 | 22.8 | 45.6 | 53.1 | 106.2 |
| 22 (56) | 20.0 | 24.5 | 49.1 | 56.2 | 112.4 |
| 23 (58) | 20.0 | 26.3 | 52.5 | 59.3 | 118.6 |
| 24 (61) | 20.0 | 28.0 | 56.0 | 62.4 | 124.8 |
| 25 (64) | 20.0 | 29.7 | 59.4 | 65.5 | 131.0 |
| 26 (66) | 20.0 | 31.4 | 62.9 | 68.6 | 137.2 |
| 27 (69) | 20.0 | 33.2 | 66.3 | 71.7 | 143.3 |
| 28 (71) | 20.0 | 34.9 | 69.7 | 74.8 | 149.5 |
| 29 (74) | 20.0 | 36.6 | 73.2 | 77.9 | 155.7 |
| 30 (76) | 20.0 | 38.3 | 76.6 | 81.0 | 161.9 |

The foregoing describes only one embodiment of the present invention. Modifications, obvious to those skilled in the art, can be made thereto without departing from the scope of the invention.

In particular, extension of the present invention to other forms of discrete level displays such as plasma displays would be readily apparent to those skilled in the art.

Figure 28:
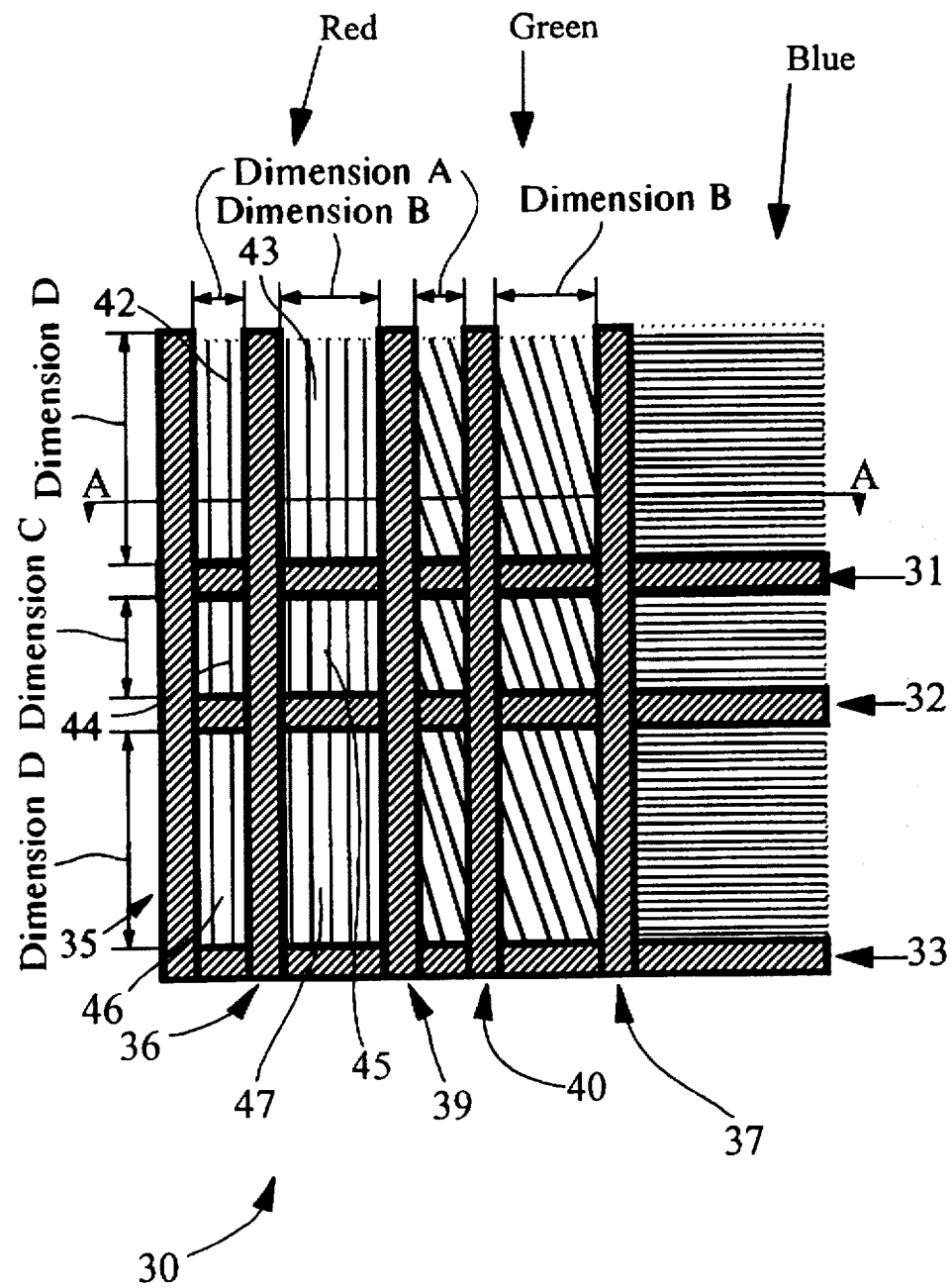
FIG. 28 illustrates a single pixel constructed in accordance with an alternative embodiment.

In the above-explained embodiment, each of three primary colour pixels, i.e., the red, green and blue pixels, is divided into six areas so that they each may realize a gradation display with 16 levels. However, the present invention is not limited to this structure and is able to be extended to the structure such that at least one of the red, green and blue primary colour pixels is constructed as shown in FIGS. 11–13 and the rest is at the liberty whether to be divided into a plurality of areas or not. One concrete example of this structure wherein the red and green primary colour pixels each have such patterns as shown in FIGS. 11 and 12 and the blue primary colour pixel only is divided into three areas is shown in FIG. 28.

We claim:

1. A display having a pixel pattern comprising a multiplicity of pixels with each pixel having a multiplicity of primary colour sub-regions of illumination each of which further comprises a multiplicity of illumination areas, the illumination areas being able to be set to an illuminating state or a non-illuminating state wherein:

(a) the primary colour sub-regions extend in a first direction substantially from one side of the pixel to the other, but in a second direction substantially normal to the first direction have only a limited extent in the pixel; and (b) the colour sub-regions are arranged to be able to be illuminated with changing intensity with a centre of illumination which is substantially stable with respect to movement in the first direction and is substantially constrained to movement in the second direction.

2. A display as claimed in claim 1 wherein the multiplicity of primary colours comprises red, blue and green.

3. A display having a pixel pattern comprising a multiplicity of pixels with each pixel having a multiplicity of primary colour sub-regions of illumination each of which further comprises a multiplicity of illumination areas, the illumination areas being able to be set to an illuminating state or a non-illuminating state wherein:

(a) the primary colour sub-regions extend in a first direction substantially from one side of the pixel to the other, but in a second direction substantially normal to the first direction have only a limited extent in the pixel;

(b) the colour sub-regions are arranged to be able to be illuminated with changing intensity with a centre of illumination which is substantially stable with respect to movement in the first direction and is substantially constrained to movement in the second direction and wherein the distance between the centre of illumination of any primary colour sub-region and the centre of illumination of the next adjacent pixel in the first direction is substantially equal to the distance between the centre of illumination of the primary colour sub-region and the centre of illumination of the corresponding primary colour sub-region of the next adjacent pixel in the second direction.

4. A display as claimed in claim 3 wherein the multiplicity of primary colours comprises red, blue and green.

5. A display having a pixel pattern comprising a multiplicity of pixels with each pixel having a multiplicity of primary colour sub-regions of illumination each of which further comprises a multiplicity of illumination areas, the illumination areas being able to be set to an illuminating state or a non-illuminating state wherein:

(a) the primary colour sub-regions extend in a first direction substantially from one side of the pixel to the other but in a second direction substantially normal to the first direction have only a limited extent in the pixel;

(b) the colour sub-regions are arranged to be able to be illuminated with changing intensity with a centre of illumination which is substantially stable with respect to movement in the first direction and is substantially constrained to movement in the second direction and wherein at least one distance between the centre of illumination of any primary colour sub-region and the corresponding primary colour sub-region of any next adjacent pixel is maximized.

6. A display as claimed in claim 5 wherein the multiplicity of primary colours comprises red, blue and green.

7. A method of determining a pixel layout pattern for a discrete level display, the display comprising a multiplicity of pixels, with each pixel including a multiplicity of primary colour sub-regions of illumination and each primary colour sub-region of illumination further comprising a multiplicity of illumination areas with each illumination area setable to an illuminating or a non illuminating state, said method comprising the steps of:

(a) determining a distance measure from the centre of the primary colour sub-region to the centre of each corresponding primary colour sub-region of adjacent next pixels;

(b) determining a minimum of the distance measures;

(c) determining a series of patterns of the illumination areas, each pattern of the series having an optical centre of illumination whose distance remains substantially constant with respect to the corresponding optical centre of illumination of a closest adjacent next primary colour sub-region but whose optical centre is able to move in a normal direction thereto.

8. A pixel layout pattern for a multi colour discrete level display, the display including a multiplicity of pixels, with each pixel including a multiplicity of primary colour sub-regions of illumination and each primary colour sub-region of illumination further comprising a multiplicity of illumination areas, with each illumination being area setable to an illuminating or a non illuminating state, wherein the illumination areas are divided into a series of illumination levels, each illumination level having an optical centre of illumination and wherein a first pixel direction is defined to be the shortest distance from the optical centre of illumination of the primary colour sub-region to the centre of a neighbouring corresponding primary colour sub-region and wherein the optical centre of illumination remains substantially constant for each level with respect to the first direction while the optical centre is able to be moved in a direction substantially normal to the first direction.

9. A pixel layout pattern as claimed in claim 8, wherein the multiplicity of primary colours comprises red, green and blue.

10. A display having a pixel pattern comprising a multiplicity of sub-regions, wherein:

(a) the sub-regions consist of a first sub-region, a second sub-region arranged at one side of a first direction of the first sub-region, a third and a fourth region arranged at both sides of a second direction of either one of the first and the second sub-regions and a fifth and a sixth sub-region arranged at both sides of the second direction of the other of the first and the second sub-regions; and (b) the ratio of the area of the first sub-region, the second sub-region, the third and the fourth sub-regions together and the fifth and the sixth sub-regions together is 1:2:4:8.

11. A display according to claim 10, wherein the third and the fourth sub-regions are set to an illuminating state or non-illuminating state in response to an image signal.

12. A display according to claim 10, wherein the first and the second sub-regions are on a same first common line.

13. A display according to claim 10, wherein the third and the fourth sub-regions are on a same first segment line, and the fifth and the sixth sub-regions are on a same second segment line.

14. A display according to claim 12 or 13, wherein the third and the fifth sub-regions are on a same second common line, and the fourth and the sixth sub-regions are on a same third common line.

15. A display according to claim 13, wherein the first sub-region is on the first segment line, and the second sub-region is on the second segment line.

16. A display according to claim 10, wherein the display is a liquid crystal display.

17. A colour display where at least two pixel patterns of pixel patterns provided for each colour comprise a multiplicity of sub-regions, respectively, wherein:

(a) the sub-regions consist of a first sub-region, a second sub-region arranged at one side of a first direction of the first sub-region, a third and a fourth region arranged at both sides of a second direction of either one of the first and the second sub-regions and a fifth and a sixth sub-region arranged at both sides of the second direction of the other of the first and the second sub-regions; and (b) the ratio of the area of the first sub-region, the second sub-region, the third and the fourth sub-regions together and the fifth and the sixth sub-regions together is 1:2:4:8.

18. A display according to claim 17, wherein the third and the fourth sub-regions are set to an illuminating state or non-illuminating state in response to an image signal.

19. A display according to claim 17, wherein the first and the second sub-regions are on a same first common line.

20. A display according to claim 17, wherein the third and the fourth sub-regions are on a same first segment line, and the fifth and the sixth sub-regions are on a same second segment line.

21. A display according to claim 19 or 20, wherein the third and the fifth sub-regions are on a same second common line, and the fourth and the sixth sub-regions are on a same third common line.

22. A display according to claim 20, wherein the first sub-region is on the first segment line, and the second sub-region is on the second segment line.

23. A display according to claim 17, wherein said display is a liquid crystal display.

* * * * *

UNITED STATES PATENT AND TRADEMARK OFFICE
CERTIFICATE OF CORRECTION

PATENT NO. : 5,751,272

DATED : May 12, 1998

INVENTOR(S) : KIA SILVERBROOK, ET AL.        Page 1 of 2

It is certified that error appears in the above-identified patent and that said Letters Patent is hereby corrected as shown below:

COLUMN 1

Figure 1:
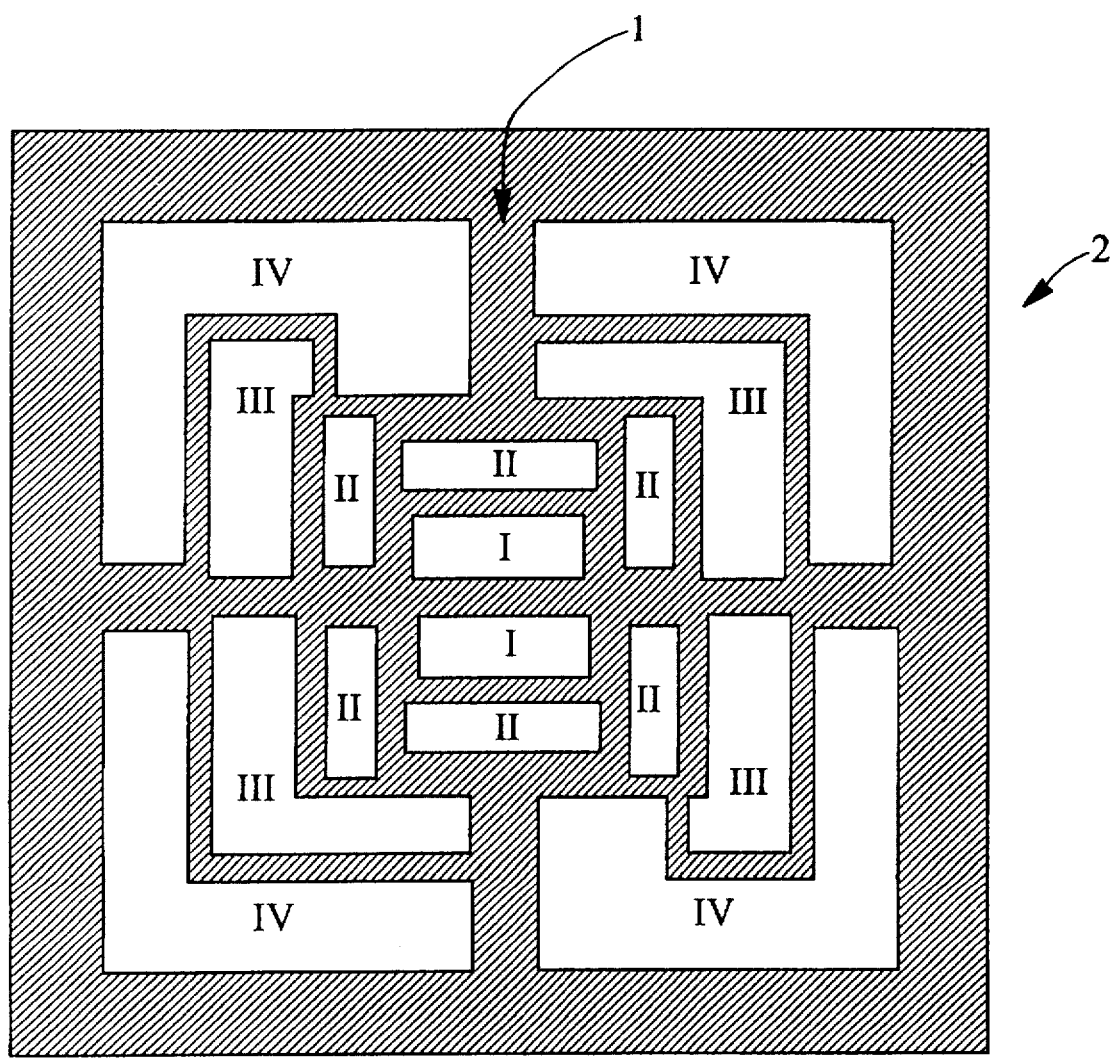
FIG. 1 reproduces the pixel arrangement illustrated in U.S. Pat. No. 5,124,695.
Figure 3A:
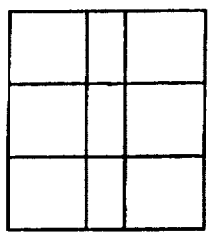
FIG. 3 reproduces the levels possible with a second pixel arrangement illustrated in EP A 361,981.
Figure 3E:
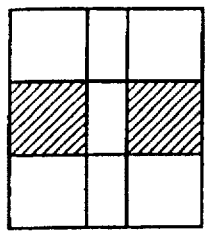
Figure 3I:
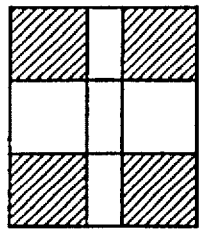
Figure 3M:
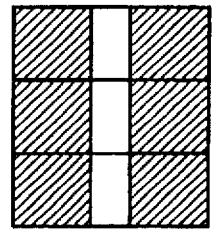
Figure 3B:
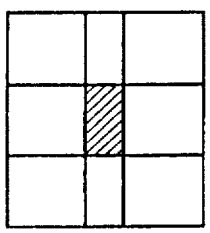
Figure 3F:
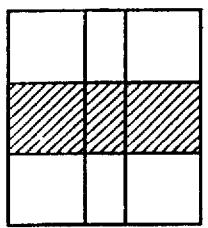
Figure 3J:
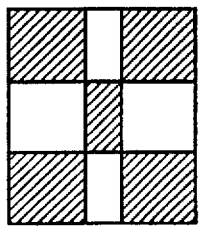
Figure 3N:
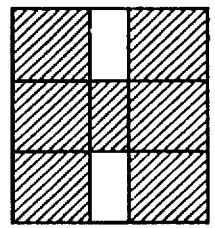
Figure 3C:
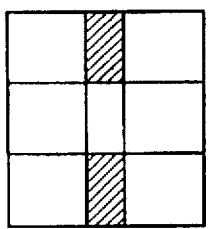
Figure 3G:
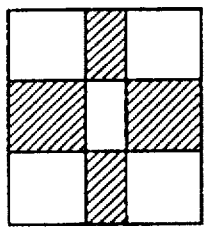
Figure 3K:
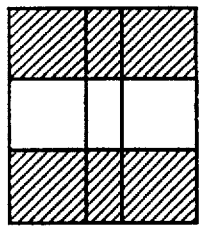
Figure 3O:
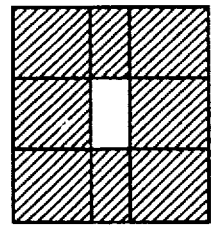
Figure 3D:
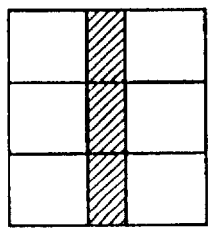
Figure 3H:
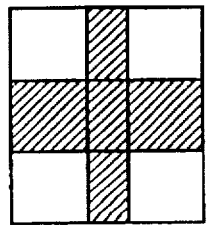
Figure 3L:
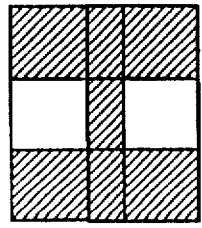
Figure 3P:
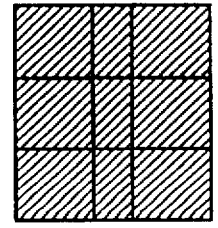

Line 62, "FIG. 2" should read --FIGS. 2A-2P--; and
    Line 66, "FIG. 3" should read --FIGS. 3A-3P--.

COLUMN 3

Line 55, "FIG. 2 reproduces" should read
        --FIGS. 2A-2P reproduce--; and
    Line 57, "FIG. 3 reproduces" should read
        --FIGS. 3A-3P reproduce--.

COLUMN 5

Line 60, "column" should read --the column--.

COLUMN 6

Line 15, "ferro" should read --ferro- --; and
    Line 40, "portion" should read --portion of--.

COLUMN 8

Line 52, "of a" should read --of an--; and
    Line 61, "infra-red" should read --infrared--.

COLUMN 9

Line 19, "of a" should read --of an--; and
    Line 53, "infra-red" should read --infrared--.

COLUMN 10

Line 42, "ferro electric" should read --ferroelectric--.

UNITED STATES PATENT AND TRADEMARK OFFICE
CERTIFICATE OF CORRECTION

PATENT NO. : 5,751,272

DATED : May 12, 1998

INVENTOR(S) : KIA SILVERBROOK, ET AL.          Page 2 of 2

It is certified that error appears in the above-identified patent and that said Letters Patent is hereby corrected as shown below:

COLUMN 12

Line 47, "pixel;" should read --pixel; and--.

COLUMN 13

Line 6, "pixel;" should read --pixel; and--; and
   Line 30, "measures;" should read --measures; and--.

Signed and Sealed this

Twenty-third Day of February, 1999

Attest:

Attesting Officer

Q. TODD DICKINSON

Acting Commissioner of Patents and Trademarks